(12) United States Patent
Nam et al.

(10) Patent No.: US 9,553,293 B2
(45) Date of Patent: Jan. 24, 2017

(54) RECHARGEABLE LITHIUM BATTERY

(71) Applicant: SAMSUNG SDI CO., LTD., Yongin-si, Gyeonggi-do (KR)

(72) Inventors: Jung-Hyun Nam, Yongin-si (KR); Jong-Hwan Park, Yongin-si (KR); Yeon-Joo Choi, Yongin-si (KR); Eon-Mi Lee, Yongin-si (KR); Hoon Seok, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 133 days.

(21) Appl. No.: 14/327,297

(22) Filed: Jul. 9, 2014

(65) Prior Publication Data

US 2015/0050544 A1 Feb. 19, 2015

(30) Foreign Application Priority Data

Aug. 14, 2013 (KR) .................. 10-2013-0096828
Dec. 6, 2013 (KR) .................. 10-2013-0151836

(51) Int. Cl.
*H01M 2/16* (2006.01)
*H01M 10/0525* (2010.01)

(52) U.S. Cl.
CPC ......... *H01M 2/1686* (2013.01); *H01M 2/1646* (2013.01); *H01M 2/1653* (2013.01); *H01M 10/0525* (2013.01)

(58) Field of Classification Search
None
See application file for complete search history.

(56) References Cited

U.S. PATENT DOCUMENTS

| 2005/0221165 | A1 | 10/2005 | Hennige et al. | |
|---|---|---|---|---|
| 2007/0082261 | A1 | 4/2007 | Lee | |
| 2009/0246614 | A1 | 10/2009 | Kim et al. | |
| 2009/0311588 | A1* | 12/2009 | Lim | H01M 2/1653 429/129 |
| 2012/0015228 | A1* | 1/2012 | Yoon | H01M 2/162 429/144 |
| 2012/0015254 | A1* | 1/2012 | Lee | H01M 2/145 429/246 |
| 2012/0301792 | A1 | 11/2012 | Ryu et al. | |

(Continued)

FOREIGN PATENT DOCUMENTS

EP 2 133 941 A1 12/2009
KR 10-2008-0106881 A 12/2008

(Continued)

OTHER PUBLICATIONS

EPO Search Report dated Oct. 24, 2014, for corresponding European Patent application 14181085.3, (5 pages).

(Continued)

*Primary Examiner* — Daniel Gatewood
(74) *Attorney, Agent, or Firm* — Lewis Roca Rothgerber Christie LLP

(57) ABSTRACT

A rechargeable lithium battery includes a positive electrode, a negative electrode, and a separator between the positive electrode and the negative electrode. The separator includes a substrate having a first side facing the negative electrode and a second side facing the positive electrode. A first layer is positioned on the first side of the substrate and includes an organic material, and a second layer is positioned on the second side of the substrate and includes an inorganic material.

20 Claims, 8 Drawing Sheets

(56) References Cited

U.S. PATENT DOCUMENTS

2013/0236766 A1    9/2013   Seo et al.
2013/0316219 A1    11/2013   Ha et al.

FOREIGN PATENT DOCUMENTS

| | | |
|---|---|---|
| KR | 10-0979084 B1 | 8/2010 |
| KR | 10-2010-0113030 A | 10/2010 |
| KR | 10-2011-0058129 A | 6/2011 |
| KR | 10-2011-0105365 | 9/2011 |
| KR | 10-2012-0026296 A | 3/2012 |
| KR | 10-2012-0046092 | 5/2012 |
| KR | 10-2013-0007740 A | 1/2013 |
| KR | 10-2013-0011670 A | 1/2013 |
| KR | 10-2013-0075672 | 7/2013 |

OTHER PUBLICATIONS

KIPO Office Action dated Nov. 11, 2016, for corresponding Korean Patent Application No. 10-2013-0151836 (7 pages).

\* cited by examiner

RECHARGEABLE LITHIUM BATTERY

CROSS-REFERENCE TO RELATED APPLICATIONS

This application claims priority to and the benefit of Korean Patent Applications Nos. 10-2013-0096828 and 10-2013-0151836 filed in the Korean Intellectual Property Office on Aug. 14, 2013, and Dec. 6, 2013, respectively, the entire contents of both of which are incorporated herein by reference.

BACKGROUND

1. Field

A rechargeable lithium battery is disclosed.

2. Description of the Related Art

A rechargeable lithium battery typically includes a positive electrode, a negative electrode and a separator between the positive electrode and the negative electrode.

The separator typically includes micropores through which lithium ions move. In addition, the separator electrically insulates the positive electrode from the negative electrode and facilitates the shut-down of the battery, when the battery temperature exceeds a predetermined temperature, thus preventing or reducing overheating of the battery.

Sometimes however, previously generated heat inside the battery may cause thermal runaway of the battery, and the separator may not be able to sufficiently (or adequately) perform its insulation and shut-down functions.

SUMMARY

One or more aspects of embodiments of the present invention are directed to a rechargeable lithium battery having improved safety due to a reinforced shut-down function of the separator that allows suppression of heat generation of the battery early (e.g. before the thermal runaway of the battery occurs), and prevention of a short circuit between the positive and negative electrodes.

One embodiment of the present invention provides a rechargeable lithium battery including a positive electrode, a negative electrode, and a separator between the positive electrode and the negative electrode. The separator includes a substrate having a first side facing the negative electrode and a second side facing the positive electrode, a first layer on the first side of the substrate, and a second layer on the second side of the substrate. The first layer includes an organic material and the second layer includes an inorganic material.

The separator may further include a third layer between the substrate and the first layer. The third layer may include the inorganic material.

The separator may further include a fourth layer between the substrate and the second layer. The fourth layer may include the organic material.

The separator may further include a fifth layer between the substrate and the first layer and including the inorganic material; and a sixth layer between the substrate and the second layer and including the organic material.

The substrate may include a plurality of pores. An average size of the plurality of pores may be about 0.01 µm to about 1 µm, and a porosity of the substrate may be about 30 volume % to about 60 volume %.

The substrate may include a polyolefin-based resin, and a thickness of the substrate may be about 6 µm to about 25 µm.

The organic material may include a polymer having a melting point of about 85° C. to about 130° C. The polymer may include a polyolefin, a polyolefin derivative, a polyolefin wax, an acryl-based compound, or a combination thereof. A weight average molecular weight of the polymer may be about 300 g/mol to about 10,000 g/mol, and a size of the polymer particles may be about 100 nm to about 5 µm.

A melting point of the organic material may be lower than a melting point of the substrate.

The organic material may be included in an amount of about 1 part by weight to about 80 parts by weight based on 100 parts by weight of the substrate.

The thickness of each of the first layer, the fourth layer, and the sixth layer may be about 1 µm to about 10 µm.

The first layer, the fourth layer, and/or the sixth layer may further include a binder including a material different from the organic material.

The binder may include a styrene-butadiene rubber (SBR), carboxymethyl cellulose (CMC), polyvinylidene fluoride (PVdF), a polyvinylidene fluoride-hexafluoropropylene (PVdF-HFP) copolymer, ethylene vinylacetate (EVA), hydroxyethyl cellulose (HEC), polyvinyl alcohol (PVA), polyvinylbutyral (PVB), an ethylene-acrylic acid copolymer, acrylonitrile, a vinyl acetate derivative, polyethylene glycol, an acryl-based rubber, or a combination thereof.

The inorganic material may include $SiO_2$, $Al_2O_3$, $Al(OH)_3$, $AlO(OH)$, $TiO_2$, $BaTiO_3$, $ZnO_2$, $Mg(OH)_2$, $MgO$, $Ti(OH)_4$, aluminum nitride (AlN), silicon carbide (SiC), boron nitride (BN), or a combination thereof. The inorganic material particles may have a size of about 0.1 µm to about 5 µm, and may be sheet-shaped, spherically-shaped, non-shaped, or a combination thereof. The inorganic material may be included in an amount of about 20 parts by weight to about 200 parts by weight based on 100 parts by weight of the substrate.

The thickness of each of the second layer, the third layer, and the fifth layer may be about 0.5 µm to about 7 µm.

The second layer, the third layer, and/or the fifth layer may further include the binder.

Other embodiments are included in the following detailed description.

A rechargeable lithium battery having improved safety may be realized by reinforcing a shut-down function of the separator to suppress heat generation of the battery and prevent a short circuit between the positive and negative electrodes.

BRIEF DESCRIPTION OF THE DRAWINGS

The accompanying drawings, together with the specification, illustrate embodiments of the present disclosure, and, together with the description, serve to explain the principles of the present disclosure.

DETAILED DESCRIPTION

Figure 1:
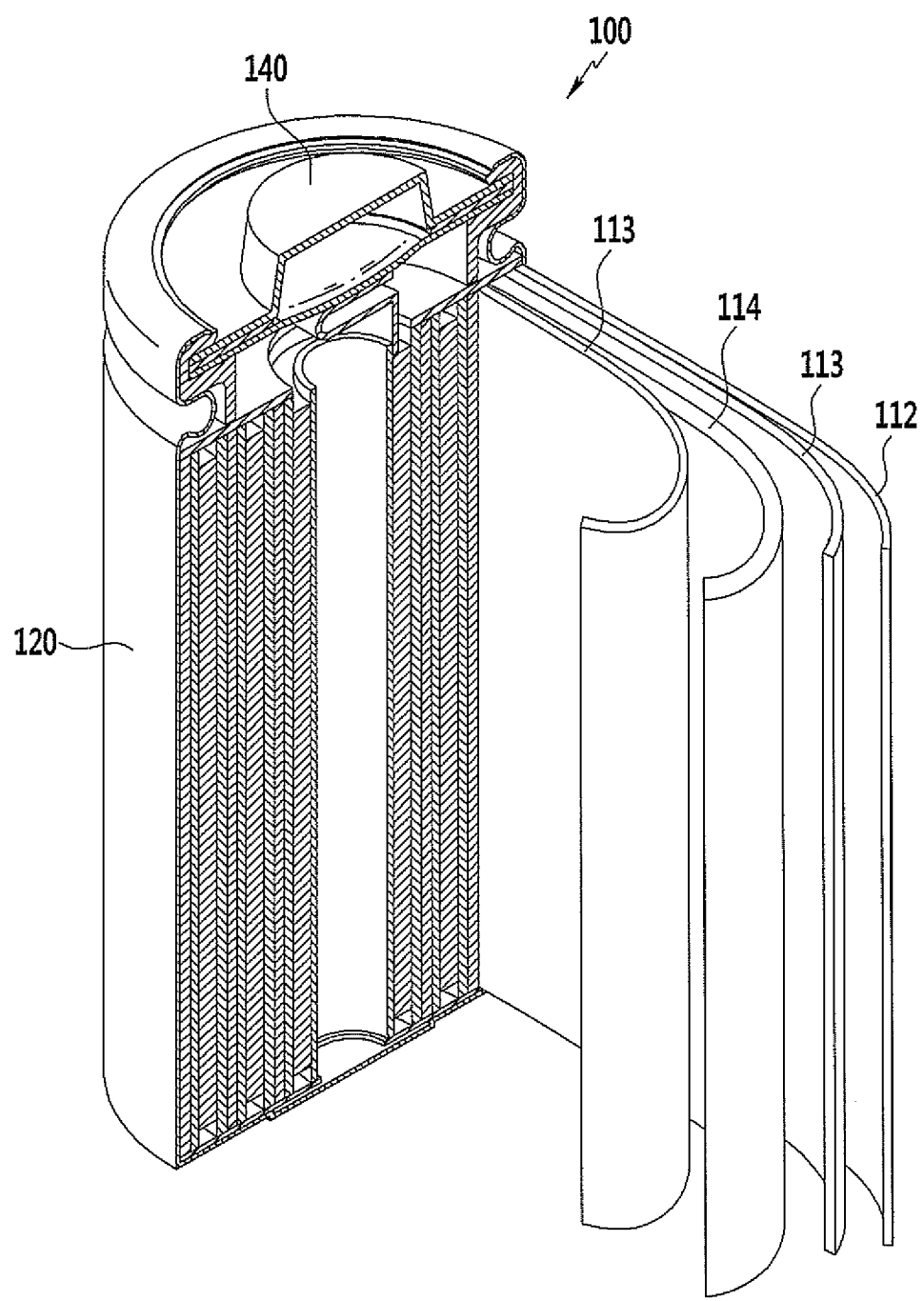
FIG. 1 is a cross-sectional perspective view of a rechargeable lithium battery according to one embodiment.

Hereinafter, exemplary embodiments of the present invention are described with reference to the accompanying drawings. However, these embodiments are exemplary, and this disclosure is not limited thereto. As those skilled in the art would realize, the described embodiments may be modified in various different ways, all without departing from the spirit or scope of the present invention. Like reference numerals generally designate like elements throughout the specification. Expressions such as "at least one of" and "one of," when preceding a list of elements, modify the entire list of elements and do not modify the individual elements of the list. Further, the use of "may" when describing embodiments of the present invention refers to "one or more embodiments of the present invention."

A rechargeable lithium battery according to one embodiment is described referring to FIG. 1.

FIG. 1 is a cross-sectional perspective view of a rechargeable lithium battery according to one embodiment.

Referring to FIG. 1, a rechargeable lithium battery 100 includes an electrode assembly including a positive electrode 114, a negative electrode 112 facing the positive electrode 114, a separator 113 between the positive electrode 114 and the negative electrode 112, and an electrolyte impregnating the positive electrode 114, the negative electrode 112, and the separator 113. The rechargeable lithium battery 100 further includes a battery case 120 housing the electrode assembly, and a sealing member 140 sealing the battery case 120.

The separator 113, according to one embodiment, includes a substrate and a coating layer on both sides of the substrate. The coating layer on one side of the substrate may include a different material than the coating layer on the other side of the substrate. For example, the coating layer positioned on one side of the substrate may include an organic material, and the coating layer positioned on the other side of the substrate may include an inorganic material.

The separator, and more specifically the substrate of the separator, may play a role of shutting down the battery when the temperature of the battery exceeds a predetermined temperature, thus preventing or reducing the risk of overheating the battery. When one side of the substrate is coated with the organic material, the shut-down function of the separator may be reinforced (or improved). In other words, the organic material may lower the temperature at which the battery starts to shut down and block the pores in the substrate during the shut-down, thus increasing the internal resistance of the battery and deteriorating electrical/chemical reactivity. Accordingly, the organic material may reinforce (or improve) the shut-down function of the separator and thus, suppress heat generation of the battery early (e.g. before thermal runaway of the battery occurs).

Sometimes however, even before the shut-down function can block the pores in the substrate of the separator, the separator may melt and shrink due to the heat already generated in the battery, and therefore may cause a short circuit between the positive and negative electrodes. In one embodiment of the present invention, the other side of the substrate of the separator is coated with the inorganic material. As a result, the melting temperature of the separator is decreased due to the heat generation of the battery, and shrinkage of the separator may be prevented or reduced. Accordingly, a short circuit between the positive and negative electrodes may be prevented or reduced, and further heat generation of the battery due to the shrinkage of the separator may be suppressed or reduced.

Accordingly, a separator obtained by coating an organic material on one side of a substrate and an inorganic material on the other side of the substrate may have a reinforced shut-down function, may prevent or reduce heat generation of the battery, may prevent or reduce shrinkage of the separator due to heat and thus, may suppress a short circuit between positive and negative electrodes, and improve the safety of the rechargeable lithium battery.

In one embodiment, the organic material coating layer of the separator may face the negative electrode 112 and the inorganic material coating layer of the separator may face the positive electrode 114. Thus, the separator obtained by coating the organic material on the side of the substrate facing the negative electrode and coating the inorganic material on the side of the substrate facing the positive electrode may simultaneously improve the performance and safety of the resulting battery. In one embodiment, when the inorganic material is coated on the side of the substrate facing the positive electrode, an oxidation reaction in the battery may be minimized (or reduced), and battery performance may be improved.

The structure of the rechargeable lithium battery according to embodiments of the present invention is now described referring to FIGS. 2 to 5. While FIGS. 2 to 5 are provided to illustrate embodiments of the present invention, the present invention is not limited thereto.

Figure 2:
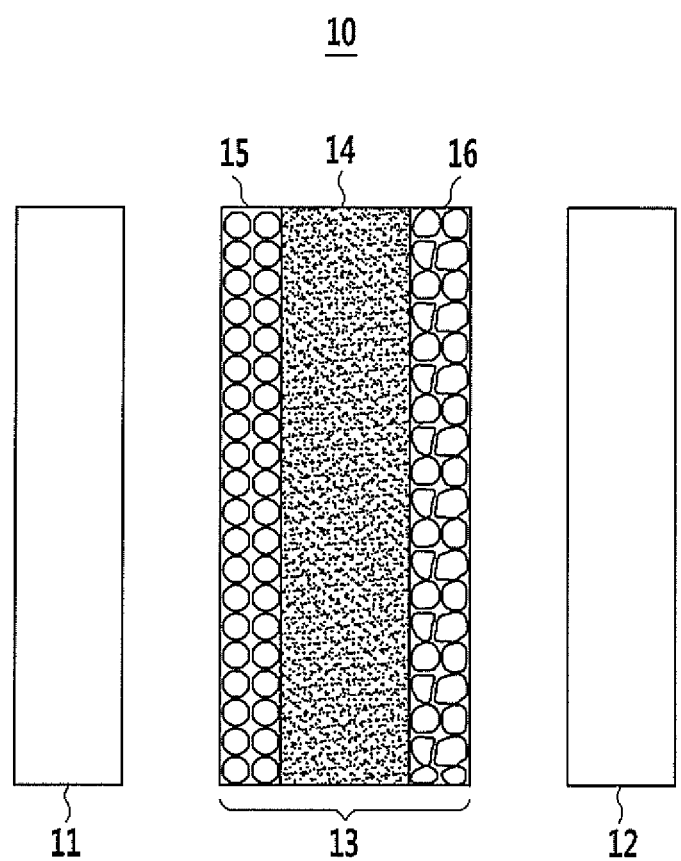
FIG. 2 is a schematic cross-sectional view of a structure of a rechargeable lithium battery according to one embodiment.

FIG. 2 is a schematic cross-sectional view of the structure of a rechargeable lithium battery according to one embodiment.

Referring to FIG. 2, a rechargeable lithium battery 10 includes a negative electrode 11, a positive electrode 12, and a separator 13 between the negative electrode 11 and the positive electrode 12. The separator 13 includes a substrate 14 having a first side facing the negative electrode 11 and a second side facing the positive electrode 12, and a coating layer including a first layer 15 on the first side of the substrate 14, and a second layer 16 on the second side of the substrate 14. In one embodiment, the first layer 15 may include an organic material, and the second layer 16 may include an inorganic material.

In one embodiment, the separator 13 having the organic material coated on the side of the substrate 14 facing the negative electrode 11 and the inorganic material coated on the side of the substrate 14 facing the positive electrode 12 has a reinforced shut-down function and may suppress or reduce heat generation of the battery early (e.g. before thermal runaway of the battery occurs) and may prevent or reduce a short circuit between the positive and negative electrodes, thus improving the safety of the rechargeable lithium battery.

Figure 3:
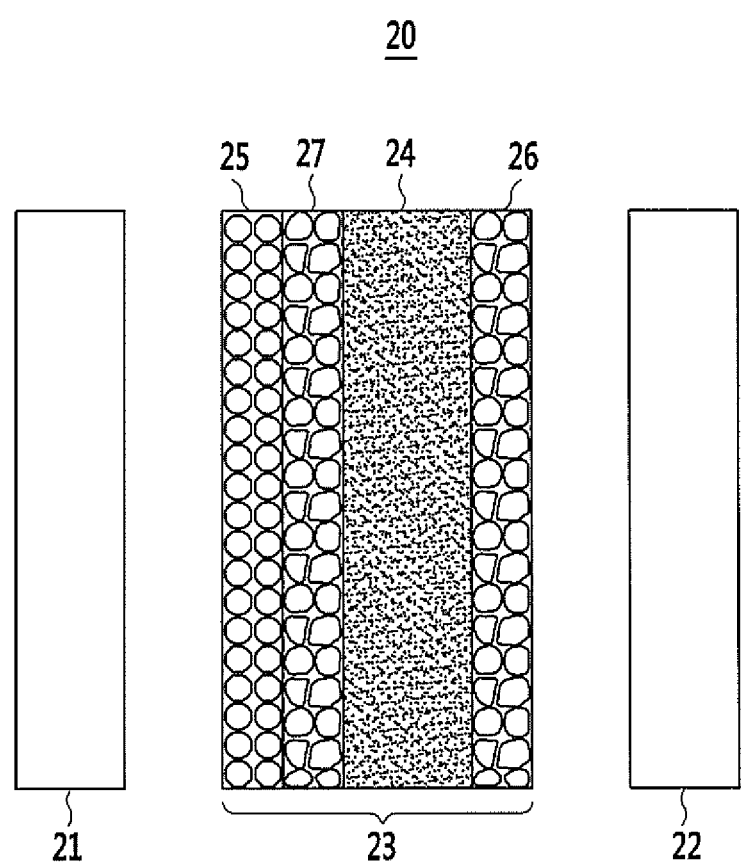
FIG. 3 is a schematic cross-sectional view of a structure of a rechargeable lithium battery according to another embodiment.

FIG. 3 is a schematic cross-sectional view of a structure of a rechargeable lithium battery according to another embodiment.

Referring to FIG. 3, a rechargeable lithium battery 20 includes a negative electrode 21, a positive electrode 22, and a separator 23 between the negative electrode 21 and the positive electrode 22. The separator 23 includes a substrate 24 having a first side facing the negative electrode 21 and a second side facing the positive electrode 22, and a coating layer including a first layer 25 on the first side of the substrate 24, a second layer 26 on the second side of the substrate 24, and a third layer 27 between the substrate 24 and the first layer 25. In one embodiment, the first layer 25 may include an organic material, and the second layer 26 and the third layer 27 may each include an inorganic material.

In one embodiment, the separator 23 may be obtained by coating the organic material and the inorganic material on the side of the substrate 24 facing the negative electrode 21, for example, by coating the inorganic material on the side of the substrate 24 facing the negative electrode 21, and coating the organic material on the inorganic material, and by coating the inorganic material on the other side of the substrate 24 facing the positive electrode 22, and the resulting separator has a reinforced shut-down function and thus, may suppress or reduce heat generation of the battery early (e.g. before thermal runaway of the battery occurs) and may suppress or reduce the risk of a short circuit between the positive and negative electrodes, thus improving the safety of the rechargeable lithium battery 20.

Figure 4:
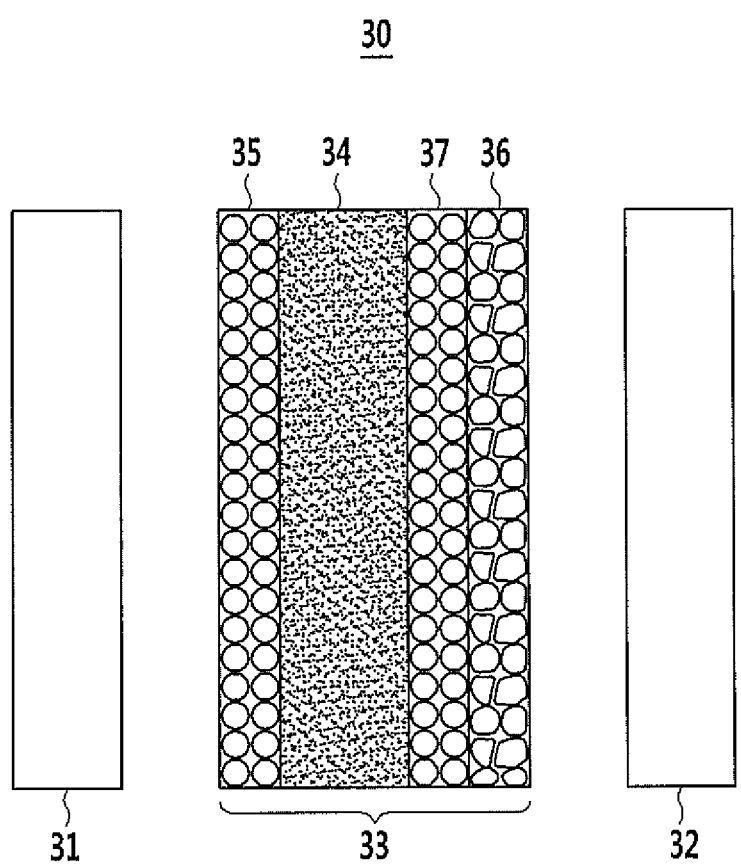
FIG. 4 is a schematic cross-sectional view of a structure of a rechargeable lithium battery according to yet another embodiment.

FIG. 4 is a schematic cross-sectional view of a structure of a rechargeable lithium battery according to another embodiment.

Referring to FIG. 4, a rechargeable lithium battery 30 includes a negative electrode 31, a positive electrode 32, and a separator 33 between the negative electrode 31 and the positive electrode 32. The separator 33 includes a substrate 34 having a first side facing the negative electrode 31 and a second side facing the positive electrode 32, and a coating layer including a first layer 35 on the first side of the substrate 34, a second layer 36 on the second side of the substrate 34, and a fourth layer 37 between the substrate 34 and the second layer 36. In one embodiment, the first layer 35 and the fourth layer 37 may each include an organic material, and the second layer 36 may include an inorganic material.

In one embodiment, the separator 33 is obtained by coating an organic material on the side of the substrate facing the negative electrode and coating an organic material and an inorganic material on the side of the substrate facing the positive electrode (e.g. by coating the organic material on the side of the substrate 33 facing the positive electrode 32, and then coating the inorganic material on the organic material), and the resulting separator has a reinforced shut-down function and thus, may suppress or reduce heat generation of the battery early (e.g. before thermal runaway of the battery occurs) and may prevent or reduce the risk of a short-circuit between the positive and negative electrodes, thus improving the safety of the rechargeable lithium battery 30.

Figure 5:
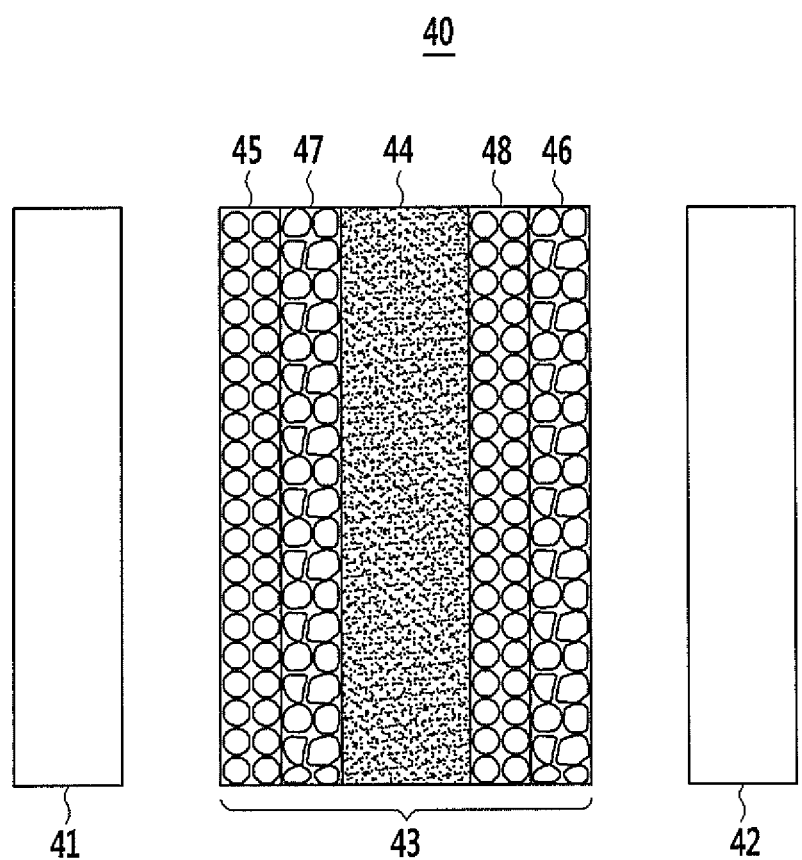
FIG. 5 is a schematic cross-sectional view of a structure of a rechargeable lithium battery according to a further embodiment.

FIG. 5 is a schematic cross-sectional view of a structure of a rechargeable lithium battery according to another embodiment.

Referring to FIG. 5, a rechargeable lithium battery 40 includes a negative electrode 41, a positive electrode 42, and a separator 43 between the negative electrode 41 and the positive electrode 42. The separator 43 includes a substrate 44 having a first side facing the negative electrode 41 and a second side facing the positive electrode 42, and a coating layer including a first layer 45 on the first side of the substrate 44, a second layer 46 on the second side of the substrate 44, a fifth layer 47 between the substrate 44 and the first layer 45, and a sixth layer 48 between the substrate 44 and the second layer 46. In one embodiment, the first layer 45 and sixth layer 48 may each include an organic material, and the second layer 46 and the fifth layer 47 may each include an inorganic material.

In one embodiment, the separator 43 may be obtained by coating the inorganic material on the side of the substrate 44 facing the negative electrode 41 and then coating the organic material on the inorganic material such that the organic material is the surface layer, and also coating the organic material on the side of the substrate 44 facing the positive electrode 42 and then coating the inorganic material on the organic material, such that the inorganic material is the surface layer, and the resulting separator has a reinforced shut-down function and may suppress or reduce heat generation of the battery early (e.g. before thermal runaway of the battery occurs) and may prevent or reduce the risk of a short-circuit between the positive and negative electrodes, thus improving the safety of the rechargeable lithium battery.

The substrate may include, without limitation, a polyolefin-based resin. The polyolefin-based resin may include, for example, a polyethylene-based resin, a polypropylene-based resin, or a combination thereof, but the polyolefin-based resin is not limited thereto.

The substrate may include a plurality of pores, through which lithium ions may move. When the battery is exothermic (or is heating up) and the temperature of the battery exceeds a predetermined temperature, the shut-down function of the separator blocks the pores of the substrate, thus increasing the internal resistance of the battery and suppressing or reducing electrical/chemical reactivity. According to one embodiment, when an organic material is coated on at least one side of the substrate of the separator, the battery starts to shut down at a lower temperature, thus reinforcing (or improving) the shut-down function of the separator, and suppressing or reducing heat generation of the battery early (before thermal runaway of the battery occurs).

In some embodiments, the pores of the separator may have an average size of about 0.01 μm to about 1 μm, and in some embodiments about 0.02 μm to about 0.1 μm. The average size of the pores may be measured by using a porometer. In some embodiments, the substrate has a porosity of about 30 volume % to about 60 volume %, and in some embodiments about 35 volume % to about 50 volume %. When the substrate has an average pore size and porosity within these ranges, the substrate may have a regular porous structure, which differs from an irregular porous structure (such as in, for example, non-woven fabric) having larger pore size and higher porosity than the aforementioned ranges. In embodiments where the pore size and porosity of the substrate are within the ranges described above, the performance and safety of the rechargeable lithium battery may be secured (or improved) by preventing (or reducing) an internal short circuit due to formation of lithium dendrites and minimizing (or reducing) resistance to movement of lithium ions.

In some embodiments, the substrate may have a thickness of about 6 μm to about 25 μm, and in some embodiments about 7 μm to about 20 μm. When the substrate has a thickness within these ranges, the capacity and safety of the rechargeable lithium battery may be secured or improved due to good physical characteristics of the substrate.

The organic material such as, for example, the organic material included in the first layer, the fourth layer, and/or the sixth layer shown in FIGS. 2 to 5, may include a polymer having a melting point of about 85° C. to about 130° C. The organic material having a melting point within this range may lower the temperature at which the battery starts to shut down and thus may suppress or reduce heat generation of the battery early (before thermal runaway of the battery occurs).

The organic material may have a lower melting point than that of the substrate. Accordingly, the organic material will melt before the substrate, and the melted organic material may form a layer that facilitates the shut-down of the battery. As a result, electrochemical reactivity within the battery can be suppressed at a lower than usual temperature, thus preventing or reducing heat generation of the battery. In one embodiment, since the shut-down of the substrate occurs after the shut-down of the organic material (i.e. the substrate melts after the organic material melts), the reactivity of the battery is initially suppressed or reduced to some extent by the shut-down of the organic material, thus resulting in a battery having improved penetration safety.

Non-limiting examples of the polymer include polyolefins, polyolefin derivatives, polyolefin waxes, acryl-based compounds, and combinations thereof. The polyolefin may be, for example, polyethylene, polypropylene, or a combination thereof, but the polyolefin is not limited thereto. In one embodiment, polyethylene may be used.

A weight average molecular weight of the polymer may be about 300 g/mol to about 10,000 g/mol, and in some embodiments about 2,000 g/mol to about 6,000 g/mol. In one embodiment, the size of the polymer particles may be about 100 nm to about 5 μm, and in some embodiments about 200 nm to about 3 μm. When the polymer particles have a weight average molecular weight and a size within these ranges, performance of the rechargeable lithium battery may be secured (or improved) by minimizing (or reducing) resistance to movement of lithium ions. In addition, the shut-down function of the separator may be further reinforced and heat generation of the battery may be suppressed or reduced early (e.g. before thermal runaway of the battery occurs).

The organic material may be included in the coating layer of the separator in an amount of about 1 part by weight to about 80 parts by weight, and in some embodiments about 30 parts by weight to about 70 parts by weight, based on 100 parts by weight of the substrate. When the amount of the organic material is within these ranges, the shut-down function of the separator may be further reinforced and heat generation of the battery may be suppressed or reduced.

The coating layers including the organic material, such as, for example, the first layer, the fourth layer, and/or the sixth layer shown in FIGS. 2 to 5, may each have a thickness of about 1 μm to about 10 μm, and in some embodiments about 2 μm to about 9 μm, or about 2 μm to about 8 μm. When the coating layer including the organic material has a thickness within these ranges, the shut-down function of the separator may be further reinforced and heat generation of the battery may be suppressed or reduced.

The coating layers including the organic material, such as, for example, the first layer, the fourth layer, and/or the sixth layer shown in FIGS. 2 to 5, may each further include a binder, in addition to the organic material described above.

The binder may include a material different from the organic material. Non-limiting examples of the binder include a styrene-butadiene rubber (SBR), carboxymethyl cellulose (CMC), polyvinylidene fluoride (PVdF), a polyvinylidene fluoride-hexafluoropropylene (PVdF-HFP) copolymer, ethylene vinylacetate (EVA), hydroxyethyl cellulose (HEC), polyvinyl alcohol (PVA), polyvinylbutyral (PVB), an ethylene-acrylic acid copolymer, acrylonitrile, a vinyl acetate derivative, polyethylene glycol, an acryl-based rubber and combinations thereof. In some embodiments, styrene-butadiene rubber (SBR), a mixture of styrene-butadiene rubber (SBR) and carboxylmethyl cellulose (CMC), ethylene vinylacetate (EVA), polyvinyl alcohol (PVA), an ethylene-acrylic acid copolymer, or an acryl-based rubber may be used as the binder, but the binder is not limited thereto.

When the binder is included in the coating layer, the binder in the coating layer may be physically cross-linked with each of the binders in the positive and negative electrodes and thus, may improve adherence between the separator and the electrodes.

An amount of the binder may be about 0.01 wt % to 0.1 wt % based on the total weight of the coating layer including the organic material. When the amount is fallen into the above range, it may have more sufficient adherence and the suitable shut-down characteristics.

The inorganic material, such as, for example, the inorganic material included in the second layer, the third layer, and/or the fifth layer shown in FIGS. 2 to 5, may include $SiO_2$, $Al_2O_3$, $Al(OH)_3$, $AlO(OH)$, $TiO_2$, $BaTiO_3$, $ZnO_2$, $Mg(OH)_2$, MgO, $Ti(OH)_4$, aluminum nitride (AlN), silicon carbide (SiC), boron nitride(BN), or a combination thereof, but the inorganic material is not limited thereto.

The inorganic material may have a particle size of about 0.1 μm to about 5 μm, and in some embodiments about 0.3 μm to about 1 μm. When the inorganic material has a particle size within these ranges, the inorganic material may be uniformly coated on the substrate, a short circuit between the positive and negative electrodes may be suppressed by further preventing or reducing shrinkage of the separator due to heat, and performance of the rechargeable lithium battery may be secured (or improved) by minimizing (or reducing) resistance to movement of lithium ions.

The particles of the inorganic material may be sheet-shaped particles, spherically-shaped particles, non-shaped particles, or a combination thereof. In one embodiment, the non-shaped particles may be used for the inorganic material. Since the non-shaped particles have less tortuosity than the sheet-shaped particle, performance of the rechargeable lithium battery may be secured (or improved) by minimizing (or reducing) resistance to movement of lithium ions.

The inorganic material may be included in the coating layer of the separator in an amount of about 20 parts by weight to about 200 parts by weight, and in some embodiments about 80 parts by weight to about 150 parts by weight, based on 100 parts by weight of the substrate. When the amount of the inorganic material is within these ranges, a short circuit between the positive and negative electrodes may be suppressed (or the risk reduced) by further preventing or reducing shrinkage of the separator due to heat. In one embodiment, the inorganic material coating layer may prevent or reduce the risk of an internal short circuit due to the formation of lithium dendrites or a foreign material, or may form an electrical insulating layer, thus securing (or improving) battery safety.

The inorganic material coating layer such as, for example, the second layer, the third layer, and/or the fifth layer shown in FIGS. 2 to 5 may have a thickness of about 0.5 μm to about 7 μm, and in some embodiments about 1 to about 6 μm, respectively. When the inorganic material coating layer has a thickness within these ranges, shrinkage of the separator may be further prevented or reduced and a short circuit between the positive and negative electrodes may be suppressed (or the risk of short circuit may be reduced). In addition, the inorganic material coating layer may prevent an internal short circuit due to the formation of lithium dendrites or a foreign material, or may form an electrical insulating layer, thus securing (or improving) battery safety.

The inorganic material coating layer such as, for example, the second layer, the third layer, and/or the fifth layer shown in FIGS. 2 to 5, may each further include a binder, in addition to the inorganic material described above.

The binder may include the same material as the binder included in the organic material coating layer described above.

An amount of the binder may be about 1 wt % to 4 wt % based on the total weight of the coating layer including the inorganic material. When the amount is fallen into the above range, it may have more sufficient adherence, good heat resistance and the suitable air permeability.

Referring back to FIG. 1, in one embodiment, the positive electrode 114 includes a positive current collector and a positive active material layer on the positive electrode current collector.

The positive current collector may be formed of aluminum, but the positive current collector is not limited thereto.

In one embodiment, the positive active material layer includes a positive active material.

The positive active material may be, without limitation, any suitable compound (e.g. a lithiated intercalation compound) capable of intercalating and deintercalating lithium ions, and in some embodiments may be a lithium metal oxide.

The lithium metal oxide may be a compound including lithium and an oxide of at least one metal selected from cobalt, manganese, nickel, aluminum, or combinations thereof. In some embodiments, the lithium metal oxide may be selected from the compounds represented by the following chemical formulae.

$Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); or $LiFePO_4$.

In the above chemical formulae, A is selected from Ni, Co, Mn, or a combination thereof; X is selected from Al, Ni, Co, Mn, Cr, Fe, Mg, Sr, V, a rare earth element, or a combination thereof; D is selected from O, F, S, P, or a combination thereof; E is selected from Co, Mn, or a combination thereof; T is selected from F, S, P, or a combination thereof; G is selected from Al, Cr, Mn, Fe, Mg, La, Ce, Sr, V, or a combination thereof; Q is selected from Ti, Mo, Mn, or a combination thereof; Z is selected from Cr, V, Fe, Sc, Y, or a combination thereof; and J is selected from V, Cr, Mn, Co, Ni, Cu, or a combination thereof.

In one embodiment, the lithium metal oxide may be selected from lithium nickel cobalt manganese oxide, lithium nickel cobalt aluminum oxide, or a combination thereof, and in some embodiments may be a mixture of lithium nickel cobalt manganese oxide and lithium nickel cobalt aluminum oxide.

The positive active material layer may further include a binder and a conductive material, in addition to the positive active material described above.

In one embodiment, the binder improves the binding properties of the positive active material particles with each other, and of the positive active material with the positive current collector. Non-limiting examples of the binder include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like, and combinations thereof.

In one embodiment, the conductive material improves the conductivity of the electrode. Any suitable electrically conductive material may be used as the conductive material, so long as it does not cause a chemical change in the battery. Non-limiting examples of the conductive material include a carbon-based material such as natural graphite, artificial graphite, carbon black, acetylene black, ketjen black, a carbon fiber, and/or the like; a metal-based material such as a metal powder or a metal fiber and/or the like of copper, nickel, aluminum, silver, and/or the like; a conductive polymer such as a polyphenylene derivative and/or the like; or a mixture thereof.

In one embodiment, the negative electrode 112 includes a negative current collector and a negative active material layer on the negative current collector.

The negative current collector may include a copper foil, but the negative current collector is not limited thereto.

The negative active material layer may include a negative active material, a binder, and optionally a conductive material.

The negative active material may include a material capable of reversibly intercalating/deintercalating lithium ions, a lithium metal, a lithium metal alloy, a material capable of doping and dedoping lithium, or a transition metal oxide.

The material that is capable of reversibly intercalating/deintercalating lithium ions may be any carbon-based negative active material suitable for use in a rechargeable lithium battery, and non-limiting examples thereof include crystalline carbon, amorphous carbon, or a mixture thereof. Non-limiting examples of the crystalline carbon include graphite such as non-shaped, sheet-shaped, flake-shaped, spherically-shaped or fiber-shaped natural graphite or artificial graphite, and non-limiting examples of the amorphous carbon include soft carbon or hard carbon, a mesophase pitch carbonized product, fired coke, and/or the like.

The lithium metal alloy may be an alloy of lithium and at least one metal selected from Na, K, Rb, Cs, Fr, Be, Mg, Ca, Sr, Si, Sb, Pb, In, Zn, Ba, Ra, Ge, Al, and/or Sn.

The material capable of doping and dedoping lithium may be Si, $SiO_x$ ($0 < x < 2$), a Si—C composite, a Si-Q alloy (where Q is an alkali metal, an alkaline-earth metal, a Group 13 to 16 element, a transition metal, a rare earth element or a combination thereof, and Q is not Si), Sn, $SnO_2$, a Sn—C composite, a Sn—R alloy (where R is an alkali metal, an alkaline-earth metal, a Group 13 to 16 element, transition metal, a rare earth element, or a combination thereof, and R is not Sn), and/or the like, or a mixture of at least one of these with $SiO_2$, but the material capable of doping and dedoping lithium is not limited thereto. Non-limiting examples of Q and R include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may be vanadium oxide, lithium vanadium oxide, and/or the like, but the transition metal oxide is not limited thereto.

In one embodiment, the binder improves the binding properties of the negative active material particles with each other, and of the negative active material particles with the negative current collector. The binder includes a non-water-soluble binder, a water-soluble binder, or a combination thereof.

The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and combinations thereof. The water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, and a combination thereof. When the water-soluble binder is used as a negative electrode binder, a cellulose-based compound may be further used to provide viscosity. The cellulose-based compound may include one or more of carboxymethyl cellulose, hydroxypropylmethyl cellulose, methyl cellulose, or alkali metal salts thereof. The alkali metal may be Na, K, or Li. The cellulose-based compound may be included in an amount of about 0.1 parts by weight to about 3 parts by weight based on 100 parts by weight of the negative active material.

In one embodiment, the conductive material improves the conductivity of the electrode. Any electrically conductive material may be used as the conductive material, so long as it does not cause a chemical change in the battery. Non-limiting examples of the conductive material include a carbon-based material such as natural graphite, artificial graphite, carbon black, acetylene black, ketjen black, a carbon fiber, and/or the like; a metal-based material such as a metal powder or a metal fiber and/or the like of copper, nickel, aluminum, silver, and/or the like; a conductive polymer such as a polyphenylene derivative and/or the like; or a mixture thereof.

The negative electrode may be manufactured by a method including mixing the negative active material, the binder, and the conductive material in a solvent to prepare a negative active material composition, and coating the negative active material composition on the negative current collector. In one embodiment, the solvent includes N-methylpyrrolidone and/or the like, but the solvent is not limited thereto.

In one embodiment, the electrolyte includes a non-aqueous organic solvent and a lithium salt.

The non-aqueous organic solvent serves as a medium for transmitting the ions taking part in the electrochemical reactions of the battery. The non-aqueous organic solvent may be selected from a carbonate-based, ester-based, ether-based, ketone-based, alcohol-based, or aprotic solvent, but the non-aqueous organic solvent is not limited thereto.

The carbonate-based solvent may include, for example, dimethyl carbonate (DMC), diethyl carbonate (DEC), dipropyl carbonate (DPC), methylpropyl carbonate (MPC), ethylpropyl carbonate (EPC), ethyimethyl carbonate (EMC), ethylene carbonate (EC), propylene carbonate (PC), butylene carbonate (BC), and/or the like, but the carbonate-based solvent is not limited thereto.

In embodiments where linear carbonate compounds and cyclic carbonate compounds are mixed, an organic solvent having a high dielectric constant and a low viscosity may be provided. In one embodiment, the cyclic carbonate compound and the linear carbonate compound are mixed together in a volume ratio of about 1:1 to about 1:9.

The ester-based solvent may be, for example, methylacetate, ethylacetate, n-propylacetate, dimethylacetate, methylpropionate, ethylpropionate, γ-butyrolactone, decanolide, valerolactone, mevalonolactone, caprolactone, and/or the like, but the ester-based solvent is not limited thereto. The ether-based solvent may be, without limitation, dibutylether, tetraglyme, diglyme, dimethoxyethane, 2-methyltetrahydrofuran, tetrahydrofuran, and/or the like, and the ketone-based solvent may be, without limitation, cyclohexanone, and/or the like. The alcohol-based solvent may be, without limitation, ethanol, isopropyl alcohol, and/or the like.

The non-aqueous organic solvent may be used alone or in a mixture, and when the organic solvent is used in a mixture, a mixing ratio of the mixture may be controlled in accordance with the desired (or suitable) battery performance.

The electrolyte may further include an overcharge inhibitor such as ethylenecarbonate, pyrocarbonate, and/or the like, but the overcharge inhibitor is not limited thereto.

The lithium salt, which is dissolved in an organic solvent, supplies the lithium ions in the battery, facilitates the basic operation of the rechargeable lithium battery, and improves lithium ion transportation between the positive and negative electrodes.

Non-limiting examples of the lithium salt include $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ where, x and y are natural numbers, LiCl, LiI, $LiB(C_2O_4)_2$ (lithium bisoxalato borate (LiBOB), or a combination thereof.

The lithium salt may be used in a concentration of about 0.1 M to about 2.0 M. When the lithium salt is included within the above concentration range, the electrolyte may have good performance and lithium ion mobility due to good electrolyte conductivity and viscosity.

Hereinafter, embodiments are illustrated with reference to examples. However, these examples are provided for illustrative purposes only, and should not in any sense be interpreted as limiting the scope of the present disclosure.

Furthermore, what is not described in this disclosure should be understood by those of ordinary skill in the art.

EXAMPLE 1

(Manufacture of Positive Electrode)

94 wt % of a mixture of $LiNi_{0.33}Co_{0.33}Mn_{0.33}O_2$ and $LiNi_{0.8}Co_{0.15}Al_{0.05}O_2$ as a positive active material, 3 wt % of carbon black as a conductive material, and 3 wt % of polyvinylidene fluoride as a binder were added to an N-methylpyrrolidone (NMP) solvent to prepare a slurry. The mixing ratio of $LiNi_{0.33}Co_{0.33}Mn_{0.33}O_2$ and $LiNi_{0.8}Co_{0.15}Al_{0.05}O_2$ was 90 wt %: 10 wt %. The slurry was coated on an aluminum (Al) thin film, dried, and then roll-pressed, thus manufacturing a positive electrode.

(Manufacture of Negative Electrode)

97.5 wt % of graphite as a negative active material and 1.5 wt % of a styrene-butadiene rubber (SBR) and 1 wt % of carboxymethyl cellulose (CMC) as a binder were added to water, which was used as a solvent, to prepare a slurry. The slurry was coated on a copper foil, dried, and then roll-pressed, thus manufacturing a negative electrode.

(Manufacture of Separator)

An organic material coating layer composition was prepared by mixing 97.5 wt % of polyethylene particles having a melting point of 110° C., an average particle size of 1 μm, and a weight average molecular weight of 5,000 g/mol (Chemipearl W401, Mitsui chemicals, Inc.) with 2.5 wt % of an acryl-based rubber (BM-900B, ZEON Corp.) in water.

An inorganic material coating layer composition was prepared by mixing 95 wt % of sheet-shaped AlO(OH) (BMM, Kawai Lime Co.) having an average particle size of 0.9 μm and 5 wt % of an acryl-based rubber (BM-900B, ZEON Corp.).

The inorganic material coating layer composition was coated on both sides of a polyethylene porous substrate having an average pore size of 0.05 μm, a porosity of 45 volume % and a melting point of 134° C., to form an inorganic material coating layer. The organic material coating layer composition was then coated on the inorganic material coating layer on one side of the porous substrate to form an organic material coating layer, thus manufacturing a separator. The substrate was 9 μm thick, the inorganic material coating layers on both sides of the substrate had a total thickness of 5 μm (i.e. the coating layer on one side of the substrate had a thickness of 2.5 um), and the organic material coating layer on one side of the inorganic material coating layer had a thickness of 2 μm.

(Preparation of Electrolyte)

An electrolyte was manufactured by mixing ethylene carbonate, ethylmethyl carbonate, and dimethyl carbonate in a volume ratio of 2:4:4 to prepare a solvent, followed by adding 1.15 M of $LiPF_6$ thereto.

(Manufacture of Rechargeable Lithium Battery Cell)

The positive electrode, the negative electrode, the electrolyte, and the separator as described above were used to manufacture a rechargeable lithium battery cell. The rechargeable lithium battery cell was manufactured by positioning the side of the substrate including the inorganic material coating layer and the organic material coating layer as the surface layer to face the negative electrode and positioning the side of the substrate including only the inorganic material coating layer to face the positive electrode as shown in of FIG. 3.

EXAMPLE 2

A rechargeable lithium battery cell was manufactured as in Example 1 except for using an organic material coating layer having a thickness of 3 μm to manufacture the separator.

EXAMPLE 3

A rechargeable lithium battery cell was manufactured as in Example 1 except for using an organic material coating layer having a thickness of 4 μm to manufacture the separator.

EXAMPLE 4

A rechargeable lithium battery cell was manufactured as in Example 1 except for using the following method to manufacture the separator.

The separator was manufactured by coating the inorganic material coating layer composition on one side of the substrate to form an inorganic material coating layer, followed by coating the organic material coating layer composition on the other side of the substrate to form an organic material coating layer. The substrate was 9 μm thick, the inorganic material coating layer was 5 μm thick, and the organic material coating layer was 4 μm thick. The rechargeable lithium battery cell was manufactured by positioning the side of the substrate including the organic material coating layer to face the negative electrode and positioning the side of the substrate including the inorganic material coating layer to face the positive electrode as shown in FIG. 2.

EXAMPLE 5

A rechargeable lithium battery was manufactured as in Example 1 except for using the following method to manufacture a separator.

The separator was manufactured by coating the organic material coating layer composition on both sides of the substrate to form an organic material coating layer, followed by coating the inorganic material coating layer composition on the organic material coating layer on one side of the substrate only to form an inorganic material coating layer. The substrate was 9 μm thick, the organic material coating layers on both sides of the substrate had a total thickness of 4 μm (i.e. the coating layer on one side of the substrate had a thickness of 2.0 um), and the inorganic material coating layer on one side of the substrate was 5 μm thick. The rechargeable lithium battery cell was manufactured by positioning the side of the substrate including only the organic material coating layer to face the negative electrode and positioning the other side of the substrate including the organic material coating layer and the inorganic material coating layer as the surface layer to face the positive electrode as shown in FIG. 4.

EXAMPLE 6

A rechargeable lithium battery cell was manufactured as in Example 1 except for using the following method to manufacture the separator.

The inorganic material coating layer composition was coated on one side of the substrate to form an inorganic material coating layer, and the organic material coating layer composition was coated thereon to form an organic material coating layer. Further, the organic material coating layer composition was coated on the other side of the substrate to form an organic material coating layer, and the inorganic material coating layer composition was coated thereon to form an inorganic material coating layer, thus manufacturing a separator. The substrate was 9 μm thick, the inorganic material coating layers on both sides of the substrate had a total thickness of 5 μm (i.e. the inorganic material coating layer on each side of the substrate had a thickness of 2.5 um), and the organic material coating layers on both sides of the substrate had a total thickness of 4 μm m (i.e. the organic material coating layer on each side of the substrate had a thickness of 2 um). The rechargeable lithium battery cell was manufactured by positioning the side of the substrate including the organic material coating layer as the surface layer to face the negative electrode and positioning the side of the substrate including the inorganic material coating layer as the surface layer to face the positive electrode as shown in FIG. 5.

EXAMPLE 7

A rechargeable lithium battery cell was manufactured as in Example 1 except for preparing the inorganic material coating layer composition by using non-shaped $Al_2O_3$ having an average particle size of 0.45 µm (AES-12, Sumitomo Corp.), instead of AlO(OH) having an average particle size of 0.9 µm, to manufacture the separator.

EXAMPLE 8

A rechargeable lithium battery cell was manufactured as in Example 7 except for using an organic material coating layer having a thickness of 3 µm to manufacture the separator.

EXAMPLE 9

A rechargeable lithium battery cell was manufactured as in Example 7 except for using an organic material coating layer having a thickness of 4 µm to manufacture a separator.

EXAMPLE 10

A rechargeable lithium battery cell was manufactured as in Example 7 except for using the following method to manufacture the separator.

The separator was manufactured by coating the inorganic material coating layer composition on one side of the substrate to form an inorganic material coating layer, followed by coating the organic material coating layer composition on the other side of the substrate to form an organic material coating layer. The substrate had a thickness of 9 µm, the inorganic material coating layer had a thickness of 5 µm, and the organic material coating layer had a thickness of 4 µm. The rechargeable lithium battery cell was manufactured by positioning the organic material coating layer on one side of the substrate to face the negative electrode and positioning the inorganic material coating layer on the other side of the substrate to face the positive electrode as shown in FIG. 2.

EXAMPLE 11

A rechargeable lithium battery cell was manufactured as in Example 7 except for using the following method to manufacture the separator.

The separator was manufactured by coating the organic material coating layer composition on both sides of the substrate to form an organic material coating layer, followed by coating the inorganic material coating layer composition on the organic material coating layer on one side of the substrate to form an inorganic material coating layer. The substrate had a thickness of 9 µm, the organic material coating layers on the both sides of the substrate had a total thickness of 4 µm, and the inorganic material coating layer on one side of the substrate had a thickness of 5 µm. The rechargeable lithium battery cell was manufactured by positioning the side of the substrate including only the organic material coating layer on one side of the substrate to face the negative electrode and positioning the side of the substrate including the organic material coating layer and the inorganic material coating layer as the surface layer to face the positive electrode as shown in FIG. 4.

EXAMPLE 12

A rechargeable lithium battery cell was manufactured as in Example 7 except for using the following method to manufacture the separator.

The inorganic material coating layer composition was coated on one side of the substrate to form an inorganic material coating layer, and the organic material coating layer composition was coated thereon to form an organic material coating layer. Further, the organic material coating layer composition was coated on the other side of the substrate to form an organic material coating layer, and the inorganic material coating layer composition was coated thereon to form an inorganic material coating layer, thus manufacturing a separator. The substrate had a thickness of 9 µm, the inorganic material coating layers on both sides of the substrate had a total thickness of 5 µm, and the organic material coating layers on both sides of the substrate had a total thickness of 4 µm. The rechargeable lithium battery cell was manufactured by positioning the side of the substrate including the organic material coating layer as the surface layer to face the negative electrode and positioning the side of the substrate including the inorganic material coating layer as the surface layer to face the positive electrode as shown in FIG. 5.

COMPARATIVE EXAMPLE 1

A rechargeable lithium battery cell was manufactured as in Example 1 except for using the following method to manufacture a separator.

The separator was manufactured by coating the inorganic material coating layer composition on one side of the substrate to form an inorganic material coating layer. The substrate had a thickness of 11 µm, and the inorganic material coating layer had a thickness of 3 µm.

COMPARATIVE EXAMPLE 2

A rechargeable lithium battery cell was manufactured as in Example 1 except for manufacturing the separator as follows.

The separator was manufactured by coating the inorganic material coating layer composition on both sides of the substrate to form an inorganic material coating layer. The substrate had a thickness of 9 µm, and the inorganic material coating layers on both sides of the substrate had a total thickness of 5 µm.

COMPARATIVE EXAMPLE 3

A rechargeable lithium battery cell was manufactured as in Example 1 except for manufacturing the separator as follows.

The separator was manufactured by coating the inorganic material coating layer composition on one side of the substrate to form an inorganic material coating layer, followed by coating the organic material coating layer composition on the other side of the substrate to form an organic material coating layer. The substrate had a thickness of 9 µm, the inorganic material coating layer had a thickness of 5 µm, and the organic material coating layer had a thickness of 4 µm. The rechargeable lithium battery cell was manufactured by positioning the side of the substrate including the organic material coating layer to face the positive electrode and positioning the side of the substrate including the inorganic material coating layer to face the negative electrode.

Amounts of the Organic Material and Inorganic Material

The amounts of the organic material and inorganic material in the separators according to Examples 1 to 12 and Comparative Examples 1 to 3 were measured. The results are shown in Table 1.

TABLE 1

|  | Amount of the organic material (parts by weight based on 100 parts by weight of the substrate) | Amount of the inorganic material (parts by weight based on 100 parts by weight of the substrate) |
| --- | --- | --- |
| Example 1 | 24.8 | 135.2 |
| Example 2 | 37.2 | 135.4 |
| Example 3 | 49.8 | 135.2 |
| Example 4 | 49.5 | 135.1 |
| Example 5 | 49.6 | 135.0 |
| Example 6 | 45.0 | 135.7 |
| Example 7 | 24.8 | 143.8 |
| Example 8 | 37.2 | 143.2 |
| Example 9 | 49.6 | 143.3 |
| Example 10 | 49.7 | 144.0 |
| Example 11 | 49.4 | 143.8 |
| Example 12 | 49.8 | 143.4 |
| Comparative Example 1 | 0 | 66.4 |
| Comparative Example 2 | 0 | 136.0 |
| Comparative Example 3 | 49.5 | 135.1 |

Evaluation 1: Thermomechanical Analysis (TMA) of Rechargeable Lithium Battery Cell Thermal properties of each of the rechargeable lithium battery cells according to Examples 1 to 12 and Comparative Examples 1 to 3 were evaluated by using a thermomechanical analyzer, and the results are provided in FIG. 6 and the following Table 2.

TABLE 2

|  | Separator shrinkage starting temperature (° C.) | Maximum shrinkage ratio (%) | Separator rupture temperature (° C.) |
| --- | --- | --- | --- |
| Example 1 | 134 | 0 (149° C.) | 174 |
| Example 2 | 134 | 0 (149° C.) | 170 |
| Example 3 | 135 | 0 (150° C.) | 169 |
| Example 4 | 134 | 0 (149° C.) | 172 |
| Example 5 | 135 | 0 (151° C.) | 176 |
| Example 6 | 134 | 0 (150° C.) | 167 |
| Example 7 | 134 | 0 (150° C.) | 173 |
| Example 8 | 134 | 0 (149° C.) | 169 |
| Example 9 | 134 | 0 (149° C.) | 172 |
| Example 10 | 134 | 0 (150° C.) | 170 |
| Example 11 | 134 | 0 (150° C.) | 173 |
| Example 12 | 135 | 0 (150° C.) | 171 |
| Comparative Example 1 | 135 | 2.1 (147° C.) | 151 |
| Comparative Example 2 | 134 | 0.5 (148° C.) | 168 |
| Comparative Example 3 | 135 | 0 (150° C.) | 171 |

Figure 6:
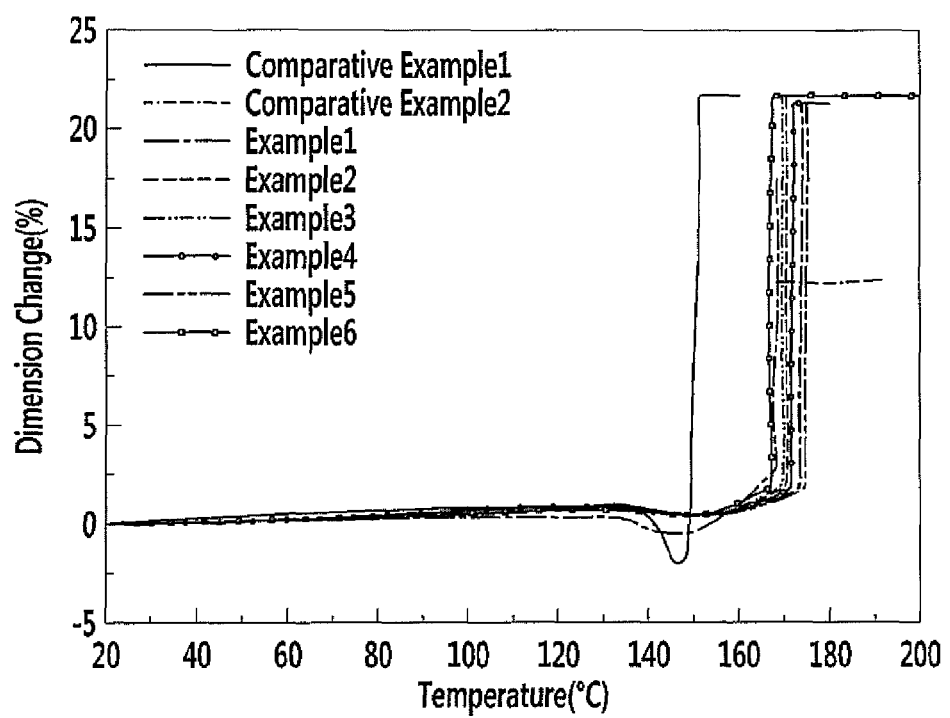
FIG. 6 is a graph comparing the results of the thermo-mechanical analysis (TMA) of the rechargeable lithium battery cells according to Examples 1 to 6 and Comparative Examples 1 and 2.

FIG. 6 is a graph comparing the results of the thermomechanical analysis (TMA) of the rechargeable lithium battery cells according to Examples 1 to 6 and Comparative Examples 1 and 2.

Referring to FIG. 6 and Table 2, the separators of Examples 1 to 12 that were obtained by coating the organic material on the side of the substrate facing the negative electrode and coating the inorganic material on the other side of the substrate facing the positive electrode, started to shrink at a temperature of about 135° C. and about 134° C., and did not further shrink when examined at a temperature of about 149° C., but were broken (i.e. ruptured) at a temperature of about 167° C. to about 176° C.

In contrast, the separators of Comparative Examples 1 and 2 that were obtained by coating only the inorganic material on one side or both sides of the substrate started to shrink at a temperature of about 135° C. (Comparative Example 1) and about 134° C. (Comparative Example 2), and shrank further when examined at a temperature of about 147° C., and were broken (i.e. ruptured) at a temperature of about 151° C. and 168° C.

Accordingly, when a separator includes an inorganic material on one side of a substrate and an organic material on the other side of the substrate, shrinkage of the separator may be suppressed or reduced and a short circuit between the positive and negative electrodes may be prevented (or risk thereof may be reduced).

Evaluation 2: Penetration Mock Test of Separator by Heat

Figure 7:
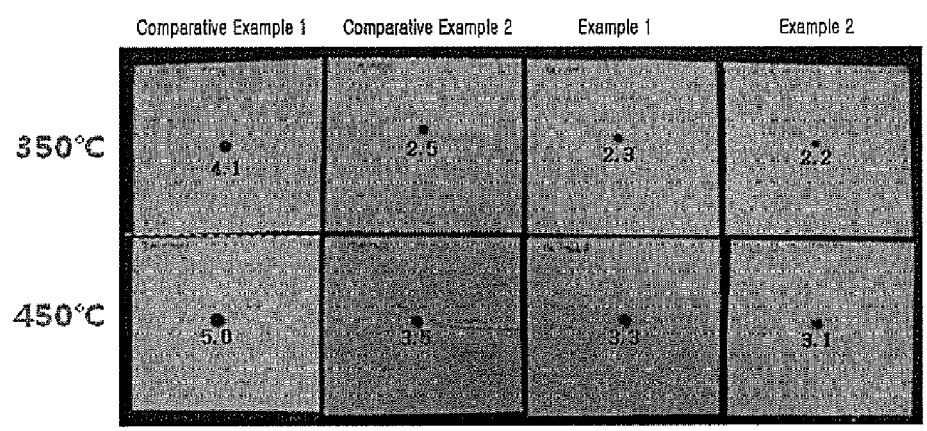
FIG. 7 is a photograph comparing the heat penetration test results of the rechargeable lithium battery cells according to Examples 1 and 2 and Comparative Examples 1 and 2.

The separators according to Examples 1 to 12 and Comparative Examples 1 to 3 were each penetrated (or punctured) by using a soldering iron, the diameter of each of the resulting penetration holes was measured, and the results are provided in FIG. 7 and the following Table 3. Herein, the soldering iron was set at 350° C. and 450° C.

TABLE 3

|  | Diameter of penetration hole at 350° C. (mm) | Diameter of penetration hole at 450° C. (mm) |
| --- | --- | --- |
| Example 1 | 2.3 | 3.3 |
| Example 2 | 2.2 | 3.1 |
| Example 3 | 2.2 | 3.2 |
| Example 4 | 2.3 | 3.3 |
| Example 5 | 2.3 | 3.3 |
| Example 6 | 2.2 | 3.1 |
| Example 7 | 2.2 | 3.2 |
| Example 8 | 2.1 | 3.2 |
| Example 9 | 2.2 | 3.3 |
| Example 10 | 2.4 | 3.3 |
| Example 11 | 2.1 | 3.3 |
| Example 12 | 2.2 | 3.2 |
| Comparative Example 1 | 4.1 | 5.0 |
| Comparative Example 2 | 2.5 | 3.5 |
| Comparative Example 3 | 2.2 | 3.2 |

FIG. 7 is a photograph showing the heat penetration test results of the rechargeable lithium battery cells according to Examples 1 and 2 and Comparative Examples 1 and 2.

Referring to FIG. 7 and Table 3, the separators according to Examples 1 to 12 that were obtained by coating the organic material on one side of the substrate facing the negative electrode and coating the inorganic material on the other side of the substrate facing the positive electrode, showed penetration holes having smaller diameters than the penetration holes in Comparative Examples 1 and 2, which used separators obtained by coating only the inorganic material on one side or both sides of the substrate. Accordingly, when a separator includes an inorganic material on one side of a substrate and an organic material on the other side of the substrate, shrinkage of the separator may be suppressed or reduced and a short circuit between the positive and negative electrodes may be prevented (or risk thereof may be reduced).

Evaluation 3: Resistance Evaluation of Rechargeable Lithium Battery Cell by Heat Resistance change depending on temperature of each of the rechargeable lithium battery cells according to Examples 1 to 12 and Comparative Examples 1 to 3 was evaluated, and the results are provided in FIG. 8 and the following Table 4.

TABLE 4

| | Shut-down starting temperature (° C.) | |
| --- | --- | --- |
| | Primary (organic material) | Secondary (substrate) |
| Example 1 | 100 | 134 |
| Example 2 | 95 | 135 |
| Example 3 | 97 | 134 |
| Example 4 | 98 | 134 |
| Example 5 | 98 | 134 |
| Example 6 | 97 | 134 |
| Example 7 | 97 | 135 |
| Example 8 | 98 | 134 |
| Example 9 | 98 | 134 |
| Example 10 | 97 | 134 |
| Example 11 | 96 | 134 |
| Example 12 | 98 | 135 |
| Comparative Example 1 | None | 134 |
| Comparative Example 2 | None | 134 |
| Comparative Example 3 | 98 | 134 |

Figure 8:
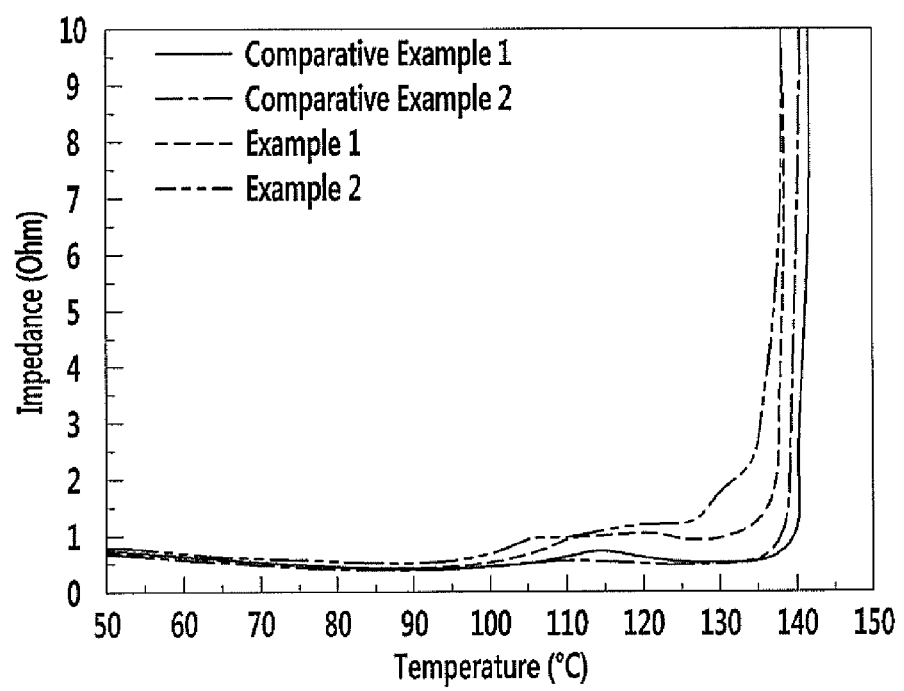
FIG. 8 is a graph comparing impedance as a function of temperature of the rechargeable lithium battery cells according to Examples 1 and 2 and Comparative Examples 1 and 2.

FIG. 8 is a graph comparing impedance as a function of temperature of the rechargeable lithium battery cells according to Examples 1 and 2 and Comparative Examples 1 and 2.

Referring to FIG. 8 and Table 4, the separators according to Examples 1 to 12 that were obtained by coating the organic material on the side of the substrate facing the negative electrode and coating the inorganic material on the side of the substrate facing the positive electrode, showed increasing resistance at a temperature of about 95° C. to about 101° C. and a low temperature for a primary shut-down, compared to the separators of Comparative Examples 1 and 2 that were obtained by coating one or both sides of the substrate with only the inorganic material.

Accordingly, a separator including an organic material on one side of a substrate and an inorganic material on the other side of the substrate can exhibit a reinforced shut-down function of the substrate and thus, may suppress or reduce heat generation of a battery cell early (e.g. before thermal runaway of the battery occurs).

Evaluation 4: Penetration Safety of Rechargeable Lithium Battery Cell

Penetration safety of each of the rechargeable lithium battery cells according to Examples 1 to 12 and Comparative Examples 1 to 3 was evaluated, and the results are provided in the following Table 5.

A separator was used for each battery cell, and penetration safety of the battery cells was evaluated. Each battery cell was charged at a current of 0.5 C to 4.20 V, and the charge was cut off at 0.05 C. The penetration safety was then tested by using a pin having a diameter of 2.5 mm at a speed of 80 mm/sec.

TABLE 5

| | Penetration safety |
| --- | --- |
| Example 1 | non-ignition (maximum temperature 122° C.) |
| Example 2 | non-ignition (maximum temperature 115° C.) |
| Example 3 | non-ignition (maximum temperature 89° C.) |
| Example 4 | non-ignition (maximum temperature 90° C.) |
| Example 5 | non-ignition (maximum temperature 85° C.) |
| Example 6 | non-ignition (maximum temperature 88° C.) |
| Example 7 | non-ignition (maximum temperature 124° C.) |
| Example 8 | non-ignition (maximum temperature 111° C.) |
| Example 9 | non-ignition (maximum temperature 83° C.) |
| Example 10 | non-ignition (maximum temperature 87° C.) |
| Example 11 | non-ignition (maximum temperature 86° C.) |
| Example 12 | non-ignition (maximum temperature 89° C.) |
| Comparative Example 1 | explosion |
| Comparative Example 2 | ignition |
| Comparative Example 3 | non-ignition (maximum temperature 88° C.) |

Referring to Table 5, the separators according to Examples 1 to 12 that were obtained by coating the organic material on the side of the substrate facing the negative electrode and coating the inorganic material on the other side of the substrate facing the positive electrode, showed good penetration safety as compared to the separators of Comparative Examples 1 and 2 that were obtained by coating only the inorganic material on one side or both sides of the substrate.

In addition, the separators according to Examples 3 to 6, which each had a thicker organic material coating layer than the separators of Examples 1 to 2, and the separators of Examples 9 to 12, which each had a thicker organic material coating layer than the separators of Examples 7 to 8, showed higher penetration safety.

Accordingly, a separator obtained by coating an organic material on one side of a substrate and coating an inorganic material on the other side of the substrate can exhibit good penetration safety, since a shut-down function of the substrate is reinforced.

Evaluation 5: Performance of Rechargeable Lithium Battery Cell

The rechargeable lithium battery cells according to Examples 1 to 12 and Comparative Examples 1 to 3 were charged 200 times at 1.0 C to 4.2 V and then discharged at 1.0 C to 3.0 V, and the cycle-life characteristics of each of the cells were measured at room temperature (i.e. 25° C.), and the results are provided in the following Table 6. Capacity retention (%) of the cells in the following Table 6 was obtained as a percentage of discharge capacity at the 200th cycle relative to discharge capacity at the first cycle.

TABLE 6

| | Capacity Retention (%) |
| --- | --- |
| Example 1 | 83 |
| Example 2 | 84 |
| Example 3 | 82 |
| Example 4 | 82 |
| Example 5 | 82 |
| Example 6 | 83 |
| Example 7 | 91 |
| Example 8 | 90 |
| Example 9 | 89 |
| Example 10 | 92 |
| Example 11 | 90 |
| Example 12 | 89 |
| Comparative Example 1 | 80 |
| Comparative Example 2 | 81 |
| Comparative Example 3 | 72 |

Referring to Table 6, the separators according to Examples 1 to 12 that were obtained by coating the organic material on the side of the substrate facing the negative electrode and coating the inorganic material on the side of the substrate facing the positive electrode, showed better room temperature cycle-life characteristics as compared to the separator of Comparative Example 3 that was obtained by coating the inorganic material on the side of the substrate facing the negative electrode and coating the organic material on the side of the substrate facing a positive electrode. Accordingly, a separator including an inorganic material on the side of a substrate facing the positive electrode may minimize or reduce an oxidation reaction and thus secure or improve battery performance.

In addition, the separators of Examples 1 to 6 using sheet-shaped AlO(OH) and the separators of Examples 7 to 12 using non-shaped $Al_2O_3$ showed good room temperature cycle-life characteristics. The non-shaped inorganic material particles had less tortuosity than the sheet-shaped inorganic material particles and thus, the non-shaped inorganic material particles minimized or reduced resistance to movement of lithium ions and secured or improved the performance of the rechargeable lithium battery cell to a higher extent than the sheet-shaped inorganic material particles.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and equivalents thereof.

What is claimed is:

1. A rechargeable lithium battery comprising
a positive electrode, a negative electrode, and a separator between the positive electrode and the negative electrode,
wherein the separator comprises:
a substrate comprising a first side facing the negative electrode and a second side facing the positive electrode;
a first layer on the first side of the substrate and comprising an organic material; and
a second layer on the second side of the substrate and comprising an inorganic material.

2. The rechargeable lithium battery of claim 1, wherein the separator further comprises a third layer between the substrate and the first layer, each of the second layer and the third layer comprising the inorganic material.

3. The rechargeable lithium battery of claim 1, wherein the separator further comprises a fourth layer between the substrate and the second layer, each of the first layer and the fourth layer comprising the organic material.

4. The rechargeable lithium battery of claim 1, wherein the separator further comprises:
a fifth layer between the substrate and the first layer, each of the second layer and the fifth layer comprising the inorganic material; and
a sixth layer between the substrate and the second layer, each of the first layer and the sixth layer comprising the organic material.

5. The rechargeable lithium battery of claim 1, wherein the substrate comprises a plurality of pores, and
wherein an average pore size of the plurality of pores is about 0.01 μm to about 1 μm, and
a porosity of the substrate is about 30 volume % to about 60 volume %.

6. The rechargeable lithium battery of claim 1, wherein a thickness of the substrate is about 6 μm to about 25 μm.

7. The rechargeable lithium battery of claim 1, wherein the organic material comprises a polymer having a melting point of about 85° C. to about 130° C.

8. The rechargeable lithium battery of claim 7, wherein a weight average molecular weight of the polymer is about 300 g/mol to about 10,000 g/mol.

9. The rechargeable lithium battery of claim 7, wherein a size of the polymer particle is about 100 nm to about 5 μm.

10. The rechargeable lithium battery of claim 1, wherein a melting point of the organic material is lower than a melting point of the substrate.

11. The rechargeable lithium battery of claim 1, wherein the organic material is present in an amount of about 1 part by weight to about 80 parts by weight based on 100 parts by weight of the substrate.

12. The rechargeable lithium battery of claim 1, the separator further comprising a fourth layer between the substrate and the second layer and/or a sixth layer between the substrate and the second layer, each of the first layer, the fourth layer and the sixth layer comprising the organic material, wherein a thickness of each of the first layer, the fourth layer, and the sixth layer is about 1 μm to about 10 μm.

13. The rechargeable lithium battery of claim 12, wherein the first layer, the fourth layer, and the sixth layer each further comprises a binder comprising a material different from the organic material.

14. The rechargeable lithium battery of claim 13, wherein the binder comprises a styrene-butadiene rubber (SBR), carboxymethyl cellulose (CMC), polyvinylidene fluoride (PVdF), a polyvinylidene fluoride-hexafluoropropylene (PVdF-HFP) copolymer, ethylene vinylacetate (EVA), hydroxyethyl cellulose (HEC), polyvinyl alcohol (PVA), polyvinylbutyral (PVB), an ethylene-acrylic acid copolymer, acrylonitrile, a vinyl acetate derivative, polyethylene glycol, an acryl-based rubber, or a combination thereof.

15. The rechargeable lithium battery of claim 1 wherein the inorganic material comprises silicon dioxide ($SiO_2$), aluminum oxide ($Al_2O_3$), aluminum hydroxide ($Al(OH)_3$), aluminum oxyhydroxide AlO(OH), titanium dioxide ($TiO_2$), barium titanate(IV) $BaTiO_3$, zinc dioxide $ZnO_2$, magnesium hydroxide ($Mg(OH)_2$), magnesium oxide (MgO), titanium hydroxide ($Ti(OH)_4$), aluminum nitride (AlN), silicon carbide (SiC), boron nitride (BN), or a combination thereof.

16. The rechargeable lithium battery of claim 1, wherein the inorganic material has a particle size of about 0.1 μm to about 5 μm.

17. The rechargeable lithium battery of claim 1, wherein the inorganic material is present in an amount of about 20 parts by weight to about 200 parts by weight based on 100 parts by weight of the substrate.

18. The rechargeable lithium battery of claim 1 the separator further comprising a third layer between the substrate and the first layer, and/or a fifth layer between the substrate and the first layer, each of the second layer, the third layer, and the fifth layer comprising the inorganic material, wherein a thickness of each of the second layer, the third layer, and the fifth layer is about 0.5 μm to about 7 μm.

19. The rechargeable lithium battery of claim 18, wherein the second layer, the third layer, and the fifth layer each further comprises a binder.

20. The rechargeable lithium battery of claim 19, wherein the binder comprises a styrene-butadiene rubber (SBR), carboxymethyl cellulose (CMC), polyvinylidene fluoride (PVdF), a polyvinylidene fluoride-hexafluoropropylene (PVdF-HFP) copolymer, ethylene vinylacetate (EVA), hydroxyethyl cellulose (HEC), polyvinyl alcohol (PVA), polyvinylbutyral (PVB), an ethylene-acrylic acid copolymer, acrylonitrile, a vinyl acetate derivative, polyethylene glycol, an acryl-based rubber, or a combination thereof.

\* \* \* \* \*